April 28, 1964 E. V. BOHN 3,131,296

PULSE POSITION ANALOG COMPUTER

Filed April 13, 1961 7 Sheets-Sheet 1

INVENTOR
ERIK V. BOHN
BY— Smart & Biggar
ATTORNEYS.

INVENTOR
ERIK V. BOHN
BY- Smart & Biggar
ATTORNEYS

PULSE POSITION ANALOG COMPUTER

Filed April 13, 1961 7 Sheets-Sheet 3

INVENTOR
ERIK V BOHN
BY– Smart & Biggar
ATTORNEYS

INVENTOR
ERIK V BOHN
BY– Smart & Biggar
ATTORNEYS

INVENTOR
ERIK V BOHN
BY– Smart & Biggar
ATTORNEYS

April 28, 1964 E. V. BOHN 3,131,296

PULSE POSITION ANALOG COMPUTER

Filed April 13, 1961 7 Sheets-Sheet 6

INVENTOR
ERIK V BOHN

BY— Smart & Biggar
ATTORNEYS

April 28, 1964 E. V. BOHN 3,131,296

PULSE POSITION ANALOG COMPUTER

Filed April 13, 1961 7 Sheets-Sheet 7

INVENTOR
ERIK V. BOHN
BY– Smart & Biggar
ATTORNEYS

United States Patent Office 3,131,296
Patented Apr. 28, 1964

3,131,296
PULSE POSITION ANALOG COMPUTER

Erik V. Bohn, Vancouver, British Columbia, Canada, assignor to Her Majesty the Queen in the right of Canada as represented by the Minister of National Defence, Ottawa, Ontario, Canada Filed Apr. 13, 1961, Ser. No. 102,816
5 Claims. (Cl. 235—176)

This invention relates to pulse position modulation analog computers.

An important field of application for modern computers is in the real time simulation of complex systems. The study of control and guidance systems in missiles and high speed aircraft is an example of systems simulation. An important commercial application occurs in complex training devices such as flight simulators. Of the two basic computer types available today (digital and analog) neither appears completely suitable for this field.

For systems simulation, a computer has to generate a large number of non-linear functions, obtain the sums and products of these functions and to solve systems of ordinary non-linear differential equations on a real-time basis. A digital computer cannot normally carry out these operations in real-time because of the large number of operations involved, and generally requires a large number of expensive analog-digital conversion devices. An analog computer can easily compute in real-time but requires an excessive amount of equipment to carry out the large number of operations. This has a detrimental effect on the accuracy and dynamic response of the analog computer; reduces its flexibility, and increases its cost enormously. The present trend in this field is to couple digital and analog computers together in order to combine their desirable features and overcome their inherent limitations.

The present invention provides a new type of analog computer which combines features of the digital and ordinary analog computer in its mode of operation. This computer is a special purpose computer specifically suited to the field of real-time systems simulation. By novel arrangements of a few basic components it is possible to carry out the operations of addition, subtraction, multiplication, function generation and integration with an accuracy comparable to the best obtainable with present precision analog computers and with the same simple, operational type of programming. This computer has the desirable feature of the digital computer in that it can handle a large number of operations with a small number of arithmetic elements.

The computer according to the invention comprises a plurality of operational units each of which is designed to perform a particular operation. The computer may also include one or more function generators adapted to generate functions on which operations are to be performed by the computer.

The operational units according to the invention are designed to accept input information in the form of one or more pulse positions. A regular series of channel pulses equidistantly spaced (in time) is produced, and each variable on which an operation is to be performed is assigned a pulse whose position with respect to a channel pulse is a known function of the variable. The operational unit demodulates the pulse position by converting it into an equivalent voltage. The unit then "operates" on the voltage, producing an output voltage which is reconverted into an output pulse. The output pulse has a time position, with respect to a channel pulse, which is a known function of the result of the operation on the variable. In a preferred embodiment of the invention, an input variable $x$ is assigned a pulse $Px$ whose time position with respect to the immediately preceding channel pulse is $(a+X)$, where $X=bx$ and $b$ is a constant. Similarly, the output pulse $Py$ has a time position $(a+Y)$, where $Y=by$ and $y$ is the desired result. The external programming of the computer ensures that each input information pulse is sent to the proper operational unit.

The invention will now be described with reference to the accompanying drawings, in which.

Figures 6A, 6B, 6C, 7:
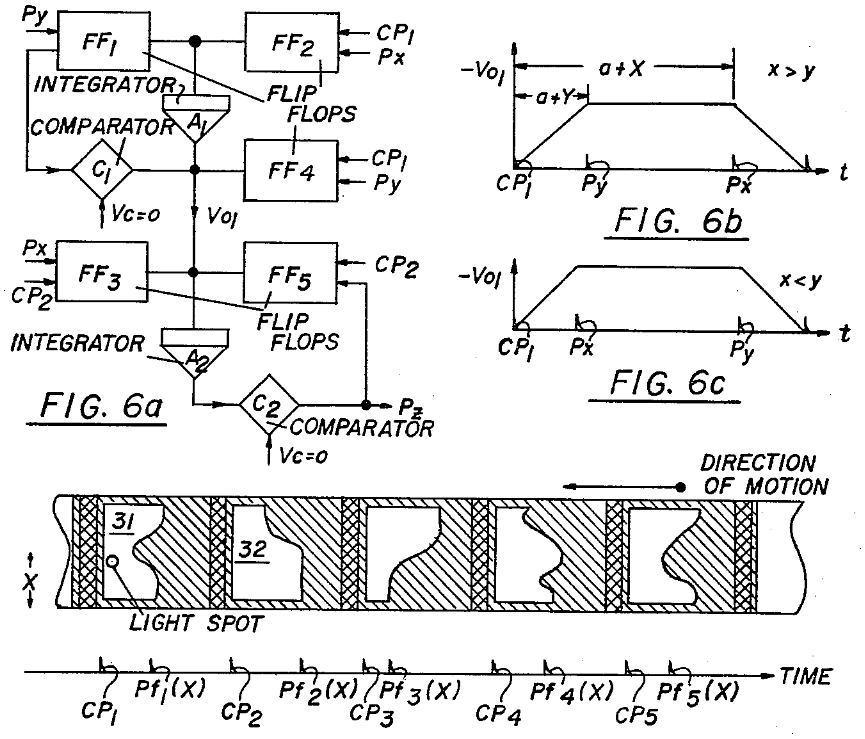
Figure 8:
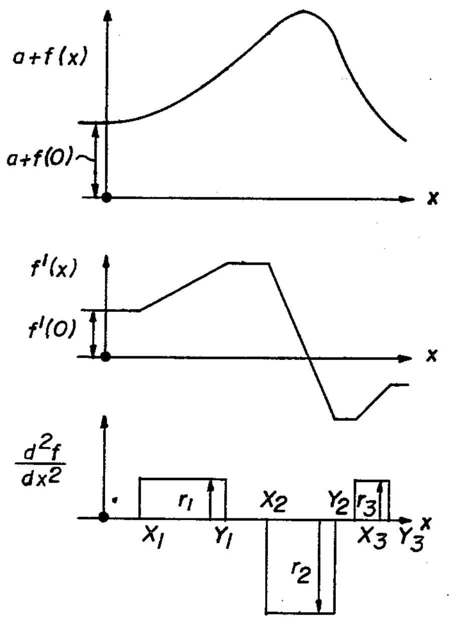
Figure 9A:
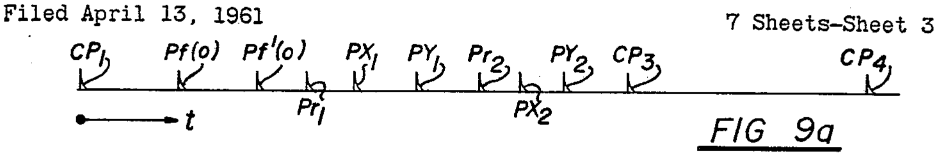
Figure 9B:
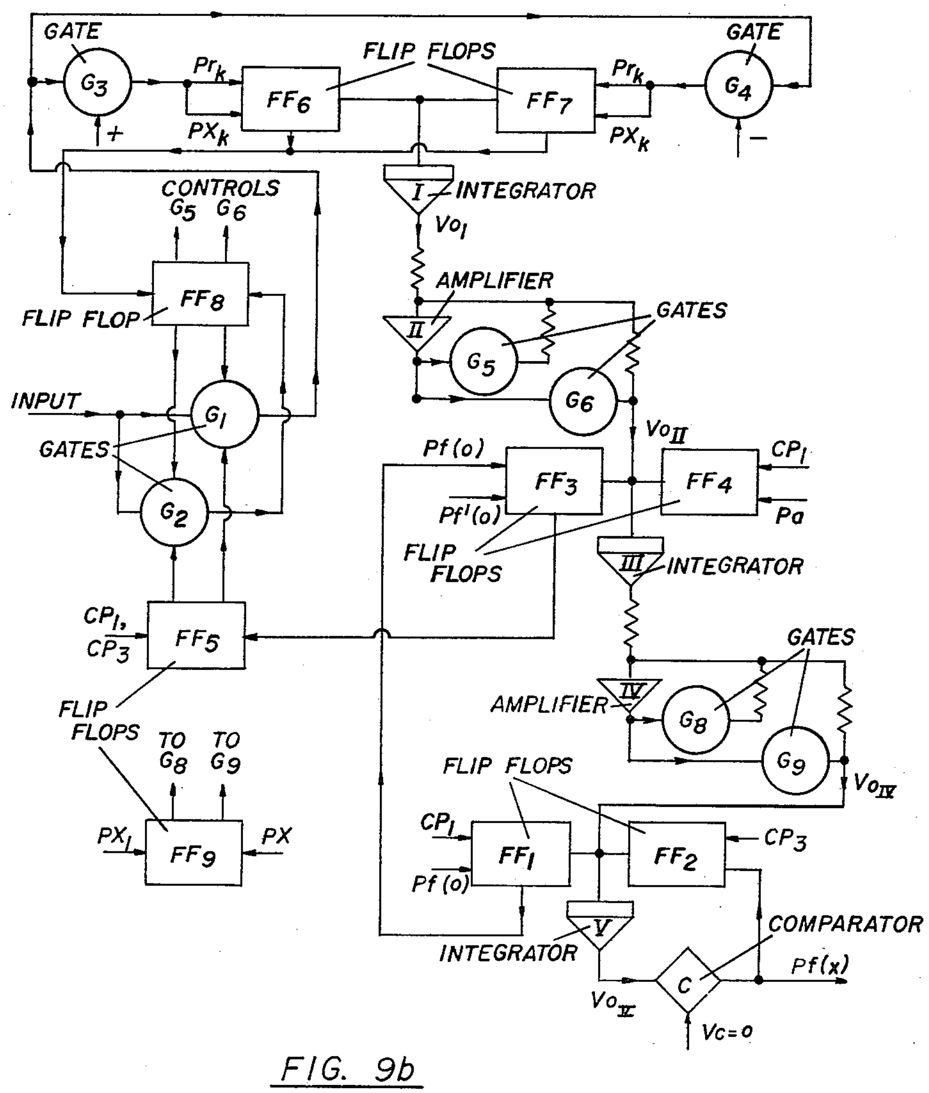
Figure 10:
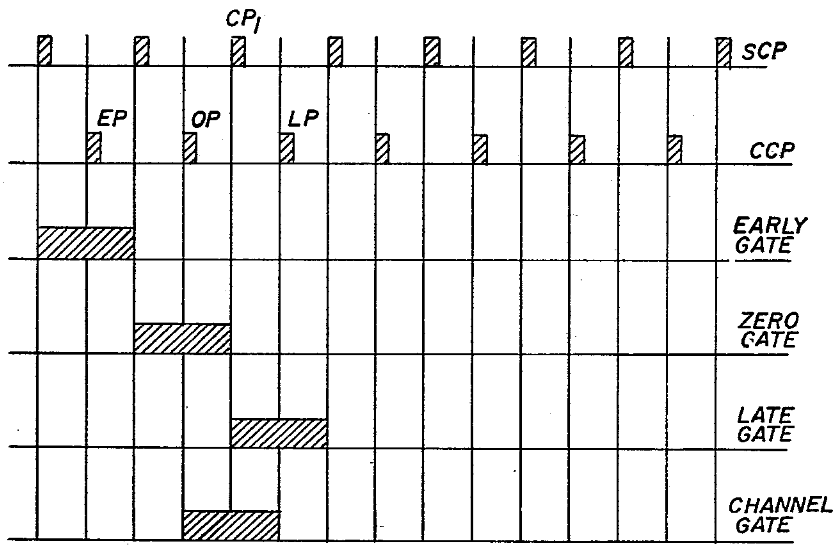
Figure 11A:
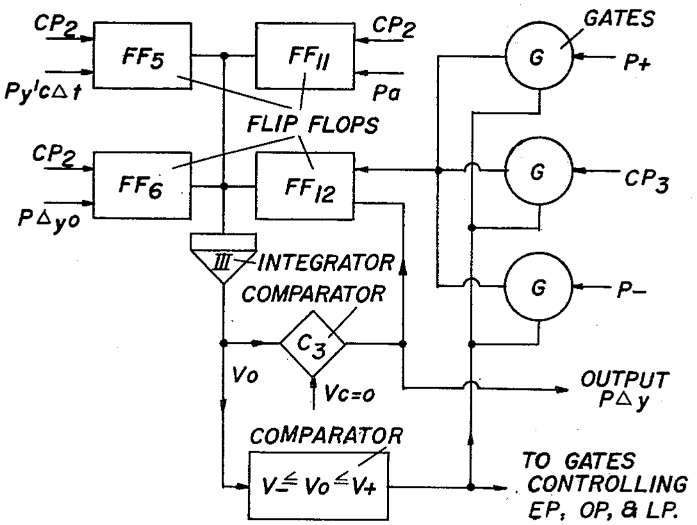
Figure 11B:
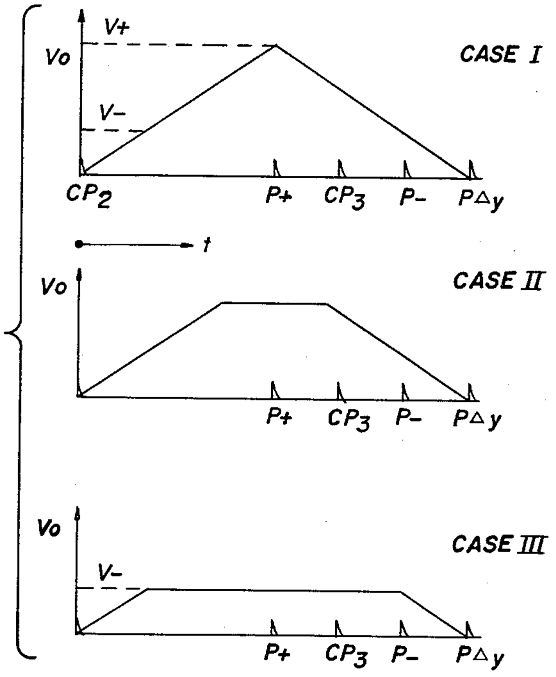
Figure 12A:
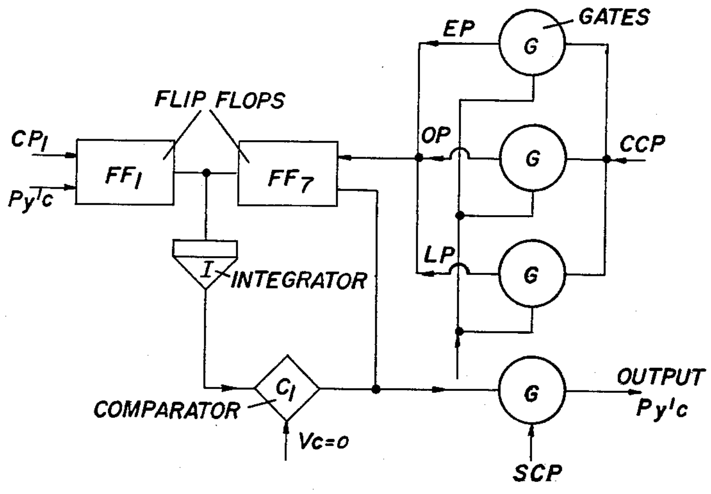
Figure 12B:
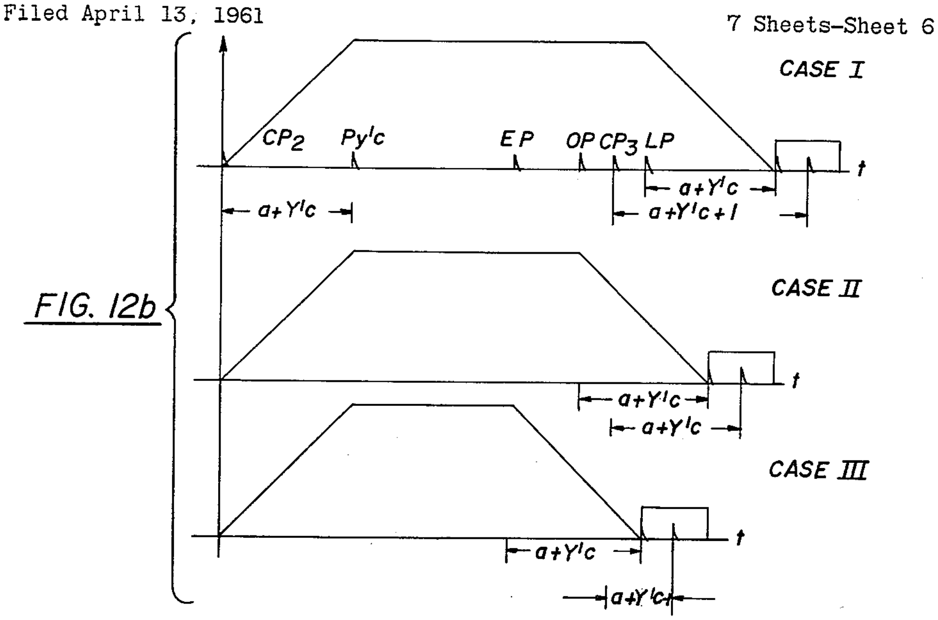
Figure 13A:
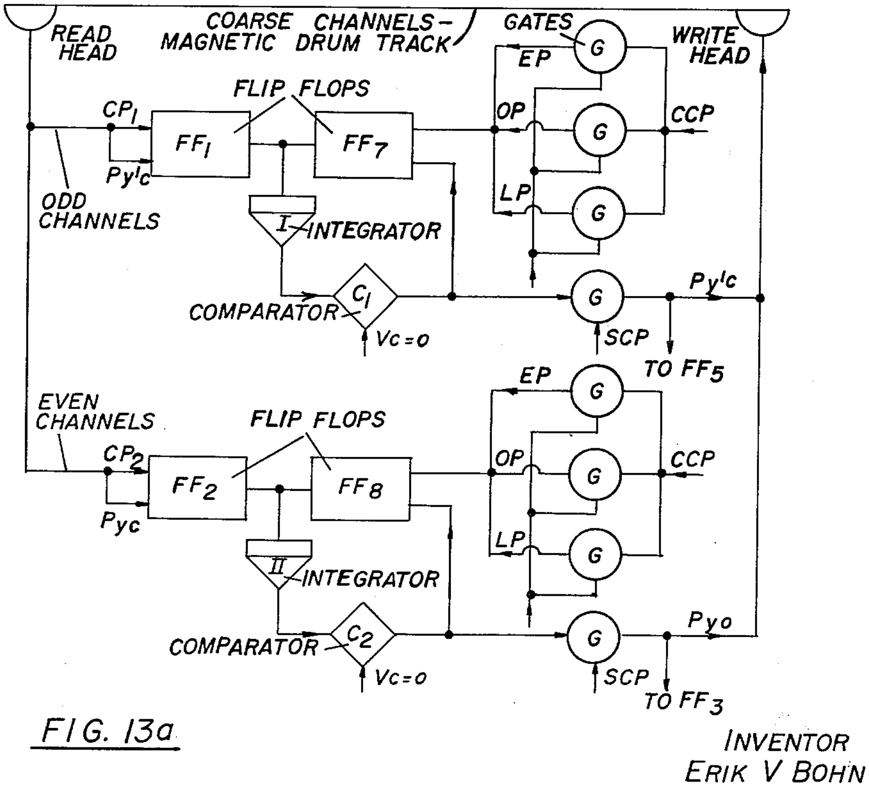
Figure 13B:
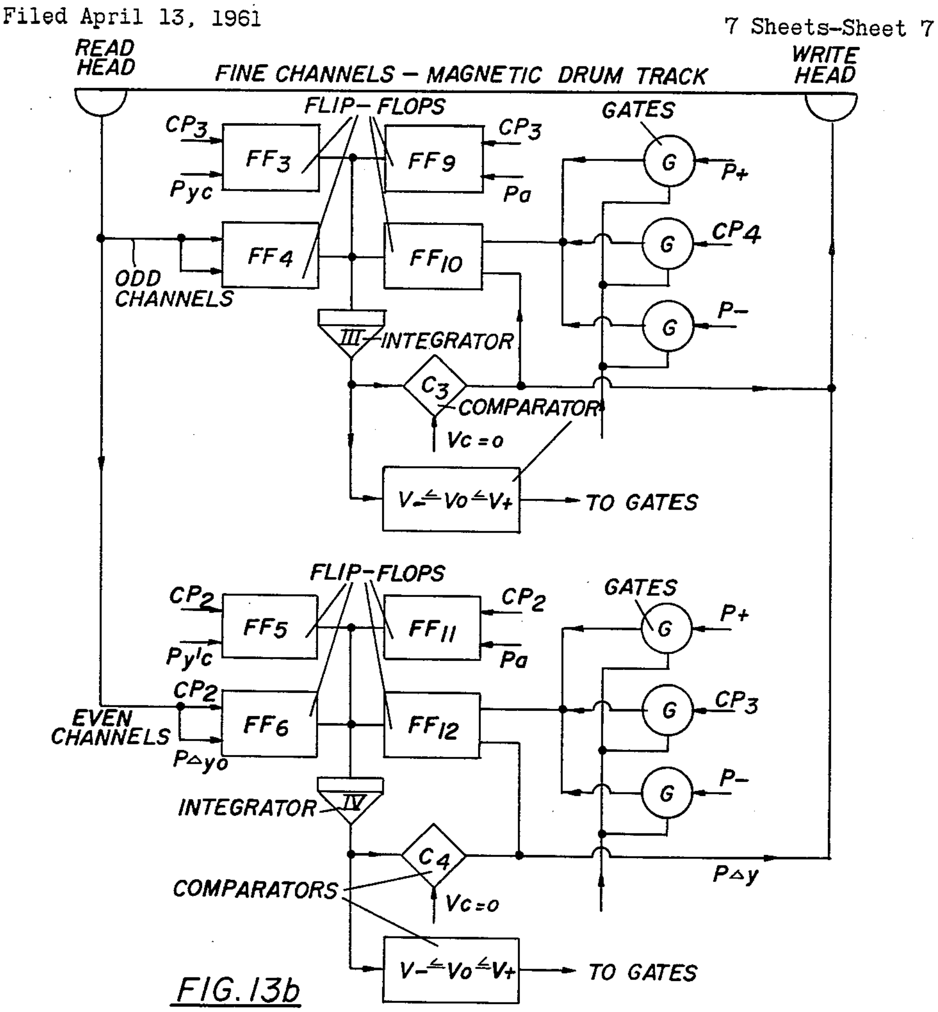
Figure 14:
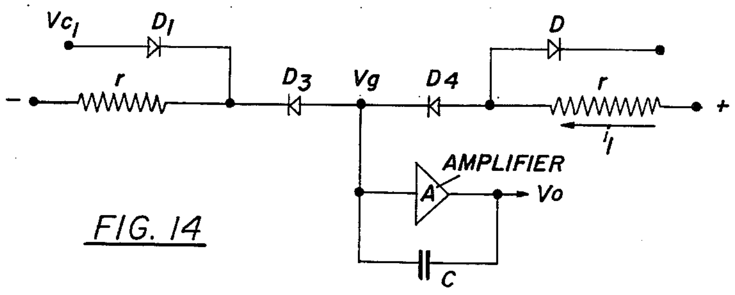

FIGURE 6*a* is a block diagram of a multiplier circuit according to the invention;

FIGURES 6*b* and 6*c* show trapezoidal waveforms which might be generated in the circuit shown in FIGURE 6*a*;

FIGURE 7 shows an endless band on which are photographed a plurality of functions, which can be used in function generating apparatus according to the invention;

FIGURE 8 shows an arbitrary function and its approximate first and second derivatives;

FIGURE 9*a* shows a series of pulses which may be used in sequence in the apparatus of FIGURE 9*b*;

FIGURE 9*b* shows a block diagram of a function generator according to the invention;

FIGURE 10 shows timing pulses which may be used in the integrator circuit shown in FIGURE 13;

FIGURE 11*a* shows a block diagram of part of the integrator circuit shown in FIGURE 13;

FIGURE 11*b* shows waveforms which may appear in the circuit of FIGURE 11*a*;

FIGURE 12*a* shows a block diagram of another part of the integrator circuit of FIGURE 13;

FIGURE 12*b* shows waveforms which may appear in the circuit of FIGURE 12*a*;

FIGURE 13 shows a block diagram of an integrator circuit according to the invention; and FIGURE 14 shows a circuit diagram of a component circuit which can be used in operational circuits according to the invention.

Figure 1:
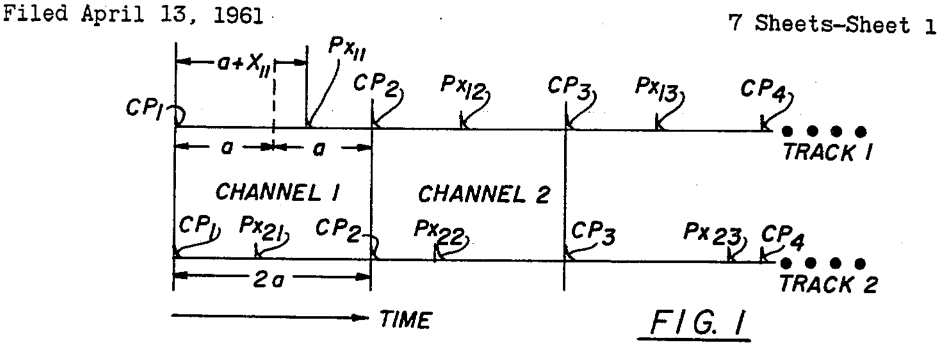
FIGURE 1 shows two time series of pulses which may be used in apparatus according to the invention.

The information to be used by the computer circuits according to the invention is assigned channels on a time-sharing basis, and tracks on an operation-sharing basis. The tracks are assigned on the basis of the operation to be performed. For example, if it is desired to integrate a function, the information pertaining to the function will be assigned a track leading through an integrator circuit. The channels are time-periods defined by channel pulses. In FIGURE 1, for example, a channel is the period of time between channel pulses $CP_1$ and $CP_2$, or the period of time between $CP_2$ and $CP_3$, etc. A constant time interval $2a$ separates the channel pulses.

Variables on which operations are to be performed are assigned pulses; for example in FIGURE 1, a variable $x_{11}$ is assigned a pulse $Px_{11}$ such that the pulse $Px_{11}$ is displaced in time from the immediately preceding channel pulse $CP_1$ by an interval $(a+X_{11})$. The time interval $X_{11}$ is proportional to the magnitude of the variable $x_{11}$. Since the total time interval $(a=X_{11})$ must be greater than zero and less than $2a$, it is seen that $X_{11}$ may assume any value between $-a$ and $+a$. Thus is is possible to operate on variables having positive or negative magnitudes. The maximum value that $X_{11}$ may have is $a$, and therefore the maximum value that the variable $x_{11}$ may have is $a/b$, if $X_{11}=bx_{11}$ where $b$ is a constant of proportionality.

In the discussion to follow, it will be considered that each variable $x$ is given a time position $(a+X)$ relative to the preceding channel pulse. However, it is possible to design apparatus within the scope of the invention so that the variable $x$ is given a time position $(a+X)$ relative to the following channel pulse. Different programming will be sufficient to make this change. It will be noted that such a change merely amounts to replacing X by $-$X; i.e. a pulse P$x$ having a time position $(a+X)$ from the preceding channel pulse obviously has a time position $(a-X)$ with respect to the following channel pulse.

It will be realized that in any computer, the variables must be scaled so that they remain within the range of computer operation. In the computer according to the present invention, the time X must not exceed $a$, and thus the variable $x$ is scaled so that $|x|\leq a/b$. This is true of both input and output variables; e.g. the variable $$y=\sum_{i=1}^{n}x_i$$

must not exceed $a/b$.

The information pulses to be used in the computer can conveniently be stored on a magnetic drum as in a digital computer, or in any convenient manner whereby the pulses may be reproduced in proper time sequence. In order to carry out operations on the pulses, it is necessary to have operational circuits which will accept the pulses in time sequence as an input, perform the required operations, and generate an output sequence of pulses which can readily be translated into the result of the operation on the input variable or variables. In other words, the operational unit must modulate the pulse positions of the input pulses, whence the designation of the computer according to the invention as a pulse-position modulation analog computer.

Figure 2:
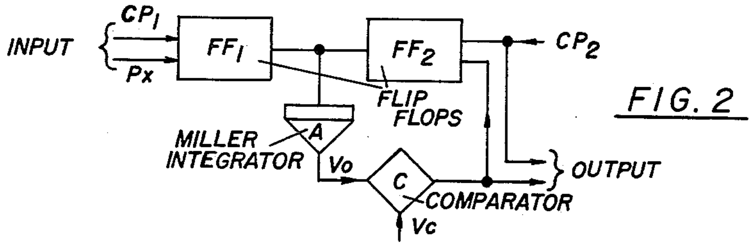
FIGURE 2 is a block diagram of a simple basic circuit according to the invention.

A basic operational circuit is shown in FIGURE 2. This circuit, like all the operational circuits according to the invention, may conveniently be constructed from standard flip flop circuits (designated FF in the drawings), Miller integrators (designated A in some of the drawings) and voltage comparators (designated C in the drawings). The operation of the circuit of FIGURE 2 is as follows:

A signal pulse P$x$ (see FIGURE 3) is assigned a time position $(a+X)$ relative to the immediately preceding channel pulse $CP_1$. Pulse P$x$ corresponds to a variable $x$, where $$x=\frac{1}{b}X$$

The pulse position is demodulated by having the channel pulse $CP_1$ set the flip flop $FF_1$ which then gates a constant direct voltage to the Miller integrator A. The output of the integrator A, which is the integral of this voltage over time is, of course, a linearly increasing ramp voltage having a very accurate constant slope indicated by the curve section 12 in FIGURE 3. The signal pulse P$x$ resets the flip flop $FF_1$, terminating the voltage sweep. The output voltage V$o$ of the integrator will keep the value reached at the termination of the sweep due to the integrator action (see section 13 of the curve shown in FIGURE 3). This voltage is then modulated or reconverted to a pulse position by having a channel pulse, for example the following channel pulse $CP_2$, set the flip flop $FF_2$, which gates a constant voltage whose magnitude is equal and opposite to that which was gated by the flip flop $FF_1$, to the Miller integrator A. This gated voltage initiates a downsweep (see section 14 of the curve of FIGURE 3) which may be terminated by resetting the flip flop $FF_2$. A voltage comparator C may be used to reset $FF_2$. The comparator C compares the output V$o$ of integrator A to a comparison voltage V$c$. When V$o$=V$c$ the comparator generates a pulse P$y$ which resets the flip flop $FF_2$, terminating the downsweep. The pulse P$y$ is the output, and in the case that V$c$=0, the output pulse P$y$ will have the same time position relative to channel pulse $CP_2$ as pulse P$x$ has with respect to channel pulse $CP_1$.

Figure 3:
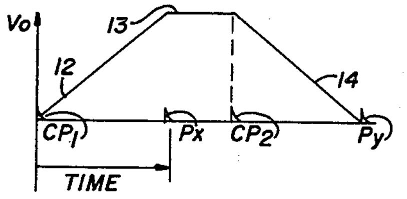
FIGURE 3 is a voltage-time diagram illustrating the behaviour of the apparatus shown in FIGURE 2.

In the discussion above and in FIGURE 3, it has been assumed that the flip flop $FF_1$ gates a positive voltage to the Miller integrator and that the flip flop $FF_2$ gates a negative voltage, equal and opposite to the aforementioned positive voltage, to the integrator. However, the reverse operation would work just as well. In the discussion which follows, the terms "positive," "negative," and "upsweep," "downsweep" etc. will be used for convenience in describing the invention, but it should be understood that when two flip flops gating voltages of opposite sign control a Miller integrator, it does not matter which gates a positive voltage and which a negative voltage. However, it is necessary that the total circuit perform its desired function, and therefore the circuit must be designed as a consistent unit.

The external programming of the computer controls the flow of pulses between the various units. This is done by selecting appropriate channel gates to gate the operational units during the pre-selected channels. These external channel gates may be obtained, for example, from photo diodes and a coded disc mounted integrally with the magnetic drum on which the pulses are stored. By using manual selector switches, any channel on any track may be used for input or output.

All common analog computer operations can be performed in accordance with the present invention by using appropriate operational units. The operations of addition, multiplication, and integration will be considered in detail. Also, apparatus suitable for the generation of non-linear and other functions will be described.

The operation of addition is based on the identity $$(X_1+a)+(X_2+a)+\ldots+(X_n+a)-(n-1)a=Y+a$$

where $$Y=\sum_{i=1}^{n}X_i$$

represents the desired sum.

Thus, if a series of variables $x_1, \ldots x_n$ is to be summed, pulses P$x_1$, . . . P$x_n$ are assigned to these variables in that manner previously described (see FIGURE 1) and then the pulses are modulated so that the above identity is used. A circuit which will perform the desired operation is shown in FIGURE 5.

Figure 5:
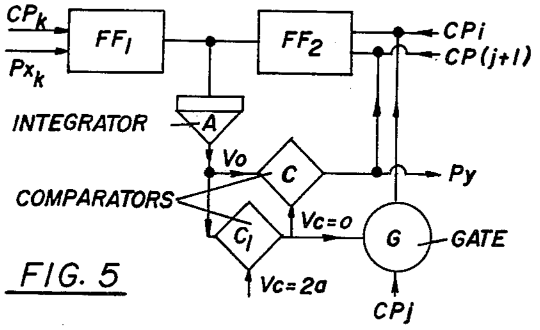
FIGURE 5 is a block diagram of an adder circuit according to the invention.

Referring to FIGURE 5, the channel pulses $CP_k$ and the pulses P$x_k$ set and reset respectively a flip flop $FF_1$. The flip flop $FF_1$ gates a constant direct voltage to an integrator A when set, and terminates the linear ramp voltage sweep output of the integrator A on being reset. The output would represent the sum $(X_1+X_2+\ldots+X_n)$ except that $(n-1)a$ must be subtracted. The $(n-1)$ term can be automatically subtracted in parts such that the output of the integrator at any instant always remains within the linear region of operation. This is done by having a comparator $C_1$ detect the integrator output and set a gate G whenever the integrator output exceeds $2a$. The gate G, when set, permits the next channel pulse $CP_j$ to set a flip flop $FF_2$ which gates to the integrator A a constant voltage equal and opposite to that gated by the flip flop $FF_1$. The flip flop $FF_2$ is then reset by the next following channel pulse $CP_{j+1}$. The action of the flip flop $FF_2$ has the effect of subtracting $2a$ from the output.

It is seen that if an odd number of terms are added, the end result is exactly what is required, i.e. $(n-1)a$ has been subtracted from $$(X_1+a)+(X_2+a)+\ldots+(X_n+a)$$

If the number of additions is even, it is merely necessary to add zero to make the total number of additions odd.

When all the terms to be added have passed through the circuit, a channel pulse $CP_i$ can set the flip flop $FF_2$ initiating a downsweep. The comparator C produces a pulse $Py$ resetting the flip flop $FF_2$ when the integrator output reaches zero. The pulse $Py$ will have a time position $(a+Y)$ with respect to the previous channel pulse, where $Y=by$, $X_i=bx_i$, $$y=\sum_{i=1}^{n}x_i$$

and $b$ is a constant.

Figure 4:
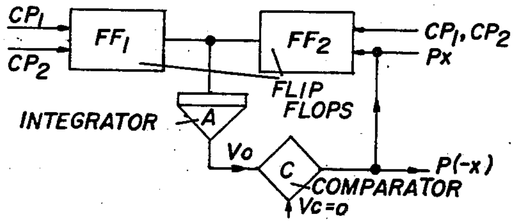
FIGURE 4 is a block diagram of a sign-reversal circuit according to the invention.

It will often be desired to substract a variable instead of adding it. Subtraction can be accomplished simply by reversing the sign of a variable and adding it. Accordingly, a simple sign-reversing circuit is shown in FIGURE 4. The sign reversing circuit can be considered to subtract the input variable from zero, and in this sense the circuit might be called a subtractor circuit. The operation of the circuit depends on the identity, $$2a-(a+X)=a-X$$

It will be assumed that it is desired to change the sign of a variable $x$ to obtain a new variable $-x$. Accordingly, the variable $x$ is assigned a pulse $Px$ having a pulse position $(a+X)$, where $X=bx$. To reverse the sign, it is necessary to obtain an output pulse $Py$ whose pulse position is $(a-X)$. (It is assumed throughout that the pulse positions are measured from the preceding channel pulse.)

The $2a$ term is generated by having channel pulses $CP_1$ and $CP_2$ (between which pulse $Px$ lies) set and reset, respectively, a flip flop $FF_1$. The flip flop $FF_1$ thus gates a positive constant voltage to the integrator A for a time interval $2a$. The $-(a+X)$ term is generated by having $CP_1$ and $Px$ set and reset, respectively, the flip flop $FF_2$. The flip flop $FF_2$ thus gates a negative voltage equal and opposite to the aforementioned positive voltage to the integrator A for a time period $(a+X)$. The integrator output voltage $Vo$ can be modulated by having channel pulse $CP_2$ initiate a negative sweep (by means of setting the flip flop $FF_2$) which is terminated by the comparator pulse $Py$ which is produced by comparator C when the integrator output voltage equals the comparison voltage $Vc$, $Vc$ being zero in this case. The pulse $Py$ will have a time position $(a-X)$ with respect to the immediately preceding channel pulse, and thus the desired sign reversal will have been effected. The pulse $Py$ may then be sent to an adder circuit, multiplier circuit, etc. if desired.

A block diagram of apparatus which can be used to multiply two variables together is shown in FIGURE 6a. It includes two Miller integrators $A_1$ and $A_2$. A flip flop $FF_1$ is adapted to gate a positive constant voltage to the integrator $A_1$, and a flip flop $FF_2$ is adapted to gate a negative constant voltage, equal in magnitude to the aforesaid positive voltage, to the integrator $A_1$. Similarly, a flip flop $FF_3$ can gate a positive voltage to the integrator $A_2$, while flip flops $FF_4$ and $FF_5$ are adapted to gate equal negative voltages to the integrator $A_2$. It is not essential that the constant voltage gated to the integrator $A_1$ by flip flop $FF_1$ be equal to the constant voltage gated by flip flop $FF_3$ to the integrator $A_2$. It is only necessary that the constant voltages, whether positive or negative, gated to any one Miller integrator in the computer be of the same magnitude. However, it will in practice be simpler to have a single constant positive voltage or a single equal negative voltage gated to all integrators in the computer. This voltage may conveniently come from a single voltage source. Precision resistors are used to regulate the current input to the Miller integrators so as to obtain different scaling for different operations. In the claims, reference to "a fifth voltage " does not necessarily imply that the "fifth" and "sixth" voltages, for example, cannot be in fact a single voltage from a single source. Similarly, in the claims, a "second pulse" and a "fourth pulse" may in fact be one and the same pulse. In the disclosure for convenience it will be assumed that all gated voltages are of equal absolute magnitude. Comparators $C_1$ and $C_2$ behave in a way similar to the action of comparators described in previous circuits according to the invention.

The multiplication operation is based on the identity $$(XY+a^2)=(X+a)(Y+a)-a(a+Y)+a(a-X)$$

It will be noted that in this case the desired result XY is associated with a scaling factor $a^2$ rather than $a$ as in the previous operations described. However, this fact is unimportant—the essential condition is that the desired result of the operation (in this case XY) should appear as an output associated only with constants and not with other functions of the input variables.

In the usual fashion, two variables $x$ and $y$ to be multiplied together are assigned signal pulses $Px$ and $Py$ whose time positions with respect to the preceding channel pulse $CP_1$ are $(a+X)$ and $(a+Y)$ respectively, where $X=bx$ and $Y=by$, and where $b$ is a constant. As usual, X and Y can assume positive or negtaive values. Referring to FIGURES 6b and 6c, it is easy to see that a trapezoidal waveform $Vo_1$ appears at the output of integrater $A_1$ if $CP_1$ and $Px$ set and reset, respectively, the flip flop $FF_2$ and if $Py$ sets the flip flop $FF_1$ which is reset by the comparator pulse produced by the comparator $C_1$ when the output voltage $Vo_1=Vc=0$. This trapezoidal waveform is integrated by the Miller integrator $A_2$ to give the term.

$$2\cdot\tfrac{1}{2}(a+Y)^2+(a+Y)(X-Y)=(a+Y)(a+X)$$

or $$2\cdot\tfrac{1}{2}(a+X)^2+(a+X)(Y-X)=(a+X)(a+Y)$$

depending on whether X or Y is larger. As can be seen, the end result is the same. The term $-a(a+Y)$ is generated by having pulses $CP_1$ and $Py$ set and reset, respectively, the flip flop $FF_4$. The pulses $Px$ and $CP_2$ set and reset, respectively, the flip flop $FF_3$ to give the term $a(a+X)$. The downsweep is initiated by having the pulse $CP_2$ set the flip flop $FF_5$, which is reset by the compartor pulse $P_z$ from the comparator $C_2$ when the output voltage of the integrator $A_2$ reaches zero. The pulse $P_z$ has a time position $(XY+a^2)$ with respect to the immediately preceding channel pulse, and thus represents the desired product.

In the above discussion, it has been assumed that there is a one-to-one correspondence between the voltage output of the integrator and the time interval over which it integrates, i.e. the slope of the ramp voltage output curve of the integrator is unity. The actual slope of the curve is irrelevant to the discussion, and for convenience throughout the disclosure it will be assumed that a one-to-one correspondence between voltage and time exists. This allows reference to a "time $(a+Y)$" and a "voltage $(a+Y)$," for example, without necessity of conversion factors. By proper choice of precision resistors any desired slope can be obtained.

It will be necessary, in many applications, to operate on non-linear functions with the pulse position modulation computer. Accordingly, suitable function generators are required to produce the required functions in a form which the computer can handle. Two methods of function generation will be discussed.

One of these is extremely simple and its accuracy would be sufficient for many engineering problems. To understand its principle consider FIGURE 7. The functions to be generated are photographed on high contrast 35 mm. film to give transparent and opaque regions as indicated. These function frames are clamped together to form an endless band. This can be fitted to a cylinder which is rotated with the magnetic drum. A small spot of light is focused on the film and is positioned by a galvanometer to a position X. A photo-multiplier tube behind the film gives an output whenever the spot strikes a transparent region. A pulse generator is adapted to produce a pulse at the beginning and end of the photo-multiplier output. As the function frames sweep by the fixed spot the functions are generated in time sequence as pulse positions. Referring to FIGURE 7, it is seen that the first transparent region 31, when swept by the light spot, causes the generation of two pulses $CP_1$ and $Pf_1(X)$. The second transparent region 32 also causes the production of two pulses $CP_2$ and $Pf_2(X)$. These pulses occur at the times the light spot strikes the beginning (left hand side) and the end (right hand side) of each transparent region. The left hand edges of the transparent regions are perpendicular to the direction of motion of the film, and are equally spaced so as to produce equally spaced channel pulses. The right hand boundary of each transparent region varies according to the nature of the function to be generated.

The scanning rate is made sufficiently high compared to the maximum rate of change of X so that the spot remains essentially fixed during one revolution of the function cylinder. The advantage of this method over other photoelectric and cathode ray tube function generators is that the same equipment is used to generate a large number of functions. In addition it is possible to use one of the function frames as a calibrating frame to correct for spot positioning errors. It is also possible to use a function frame for high speed switching of the spot from X to another variable Y so that functions of several variables can be generated with one function cylinder. The spot of light is positioned by a galvanometer. By changing the current drive the light can be rapidly moved to a new position. This is done by standard electronic switching techniques which switch the input from X to Y. The width of the film determines the maximum value of X and Y. Since the circuitry involved is relatively simple it is also possible to use several function cylinders on one shaft each with its separate circuits. This type of function generation is ideally suited to a pulse position modulation analog computer and would find a principal application in flight simulators where extreme accuracy is not required and all functions remain fixed.

In case the computer is to be used in design and research work it is desirable to have a more flexible precision method of function generation. A second method will now be described, utilizing a magnetic drum, which has this flexibility in modifying or changing functions rapidly. To understand this method of generating functions consider FIGURES 8, 9*a* and 9*b* which illustrate the theory. The function $f(x)$ to be reproduced is approximated by linear segments and parabolic arcs so that the second derivative consists of piecewise constant values $r_1$, $r_2$, $r_3$, with break points at $X_1$, $Y_1$, $X_2$, $Y_2$, $X_3$, $Y_3$. This gives an excellent approximation to most of the arbitrary functions occurring in physical systems since it approximates accurately the curvature and slope of the function over selected intervals. The function is then represented by its initial values $f(0)$ and $$f^1(0)\equiv\frac{df(0)}{dx}$$

and by its second derivative. To generate the function it is only necessary to carry out a double integration of the second derivative. A pulse position modulation computer is ideally suited to the operation. The values characterizing the function can be easily stored on a magnetic drum as pulse positions and linear sweep circuits can perform the double integration.

FIGURE 9*a* shows a typical series of pulses which represent the function shown in FIGURE 8. The channel pulse $CP_1$ is followed by pulses $Pf(0)$, $Pf^1(0)$, $Pr_1$, $PX_1$, etc. The pulses representing magnitude ($Pr_1$, $Pf^1(0)$, etc.) are given at a time position ($a+R_1$ for $Pr_1$, where $R_1=br_1$, etc.) in the usual manner. Pulses $PX_1$, $PY_1$, etc. represent the time positions of break points rather than magnitudes.

FIGURE 9*b* is a block diagram of the function generator. It includes operational amplifiers II and IV; Miller integrators I, III, V: flip flops $FF_1$ to $FF_9$ inclusive; gates $G_1$ to $G_9$ inclusive; and a comparator C. These components operate in the same manner as similar components in circuits previously described.

The operation is started by having the first channel pulse $CP_1$ set flip flop $FF_1$, the next pulse $Pf(0)$, resets flip flop $FF_1$. The output of integrator V would then represent $(a+F(0))$ and is clamped at this value by the integrator action. The reset pulse generated by flip flop $FF_1$ sets flip flop $FF_3$ which is reset by the following pulse, $Pf^1(0)$. This gives an output $(a+F^1(0))$. The $a$ is subtracted by setting and resetting flip flop $FF_4$ by pulses $CP_1$ and $Pa$ respectively. The pulse $Pa$ occurs at time $a$ with respect to the preceding channel pulse. The output of integrator III is then $F^1(0)$. The initial values $a+F(0)$ and $F'(0)$ are now in the function generator.

Once the initial values are in the integrators V and III, the remaining operation is to generate the second derivative $f''(x)$ and carry out a double integration. (Refer to FIG. 8.) The time interval between the pulses $Pr_k$ and $PX_k$ represents the change in magnitude $r_k=f''(x_k)$. This change, with the proper sign, is carried out by having these pulses set $FF_6$ and $FF_7$ depending on the state of the sign gates $G_3$ and $G_4$. The output of the integrator I represents $f^{11}(x)$ for all intervals $x_k\leqq x\leqq y_k$. However, for the interval $y_k\leqq x\leqq r_{k+1}$ the integrator I has the constant output $r_k$ and for the interval $r_{k+1}\leqq x\leqq x_{k+1}$ the output is a linear change to the new value $r_{k+1}$. The electronic switch, illustrated by the amplifier II and the gates $G_5$ and $G_6$, connects $Vo_{II}$ to integrator I for the interval $x_k\leqq x\leqq y_k$ and to ground (zero potential) for the interval $y_k\leqq x\leqq x_{k+1}$. $Vo_{II}$ then represents the second derivative $f^{11}(x)$. As illustrated in FIG. 9*b* the pulses $Pr_k$ and $PX_k$ set and reset $FF_6$ or $FF_7$ respectively. The pulses $PY_k$ and $PX_{k+1}$ must control $G_5$ and $G_6$ which make $Vo_{II}=0$ for this time interval. The selection of these pulse groups is done with $FF_8$, $G_1$ and $G_2$. The operation is initiated when the reset pulse of $FF_3$ resets $FF_5$, which had been set by $CP_1$. The gates $G_1$ and $G_2$, which are closed when $FF_5$ is in the set state, will now permit pulses to pass depending on the state of $FF_8$, which is initially reset. This permits $G_1$ to pass pulses. The first two pulses are $Pr_1$ and $PX_1$ which set and reset $FF_6$ (or $FF_7$). The reset of $FF_6$ (or $FF_7$) sets $FF_8$, closing $G_1$ and opening $G_2$. The next pulse through $G_2$ resets $FF_8$. It is seen that $G_1$ passes the pulse sequence $Pr_k$—$PX_k$ and that $G_2$ passes the pulse sequence $PY_k$. The flip flop $FF_8$ is set for the time interval between the pulses $PX_k$ and $PY_k$. The following, then, is the sequence of operations after the initial values $a+F(0)$ and $F'(0)$ are in the function generator: The reset pulse of flip flop $FF_3$ resets flip flop $FF_5$ (which had been set by pulse $CP_1$). This opens gate $G_1$ permitting the next two pulses, $Pr_1$ and $PX_1$, to pass. Depending on the sign that is required, these pulses are passed by gate $G_3$ or gate $G_4$ setting and resetting flip flop $FF_6$ or flip flop $FF_7$. The output of integrator I, $Vo_1$ represents the second derivative over the interval $X_1$ to $X_2$. To obtain the second derivative for the whole interval the reset pulse of flip flop $FF_6$ (or $FF_7$) sets flip flop $FF_8$. This opens gate $G_5$ and closes gate $G_6$ of the operational amplifier II. The output $Vo_{II}$ of operational amplifier II is zero until gate $G_6$ closes and then the output jumps to $R_1$, hence it represents the second derivative. The operation of using a feedback amplifier as a precision switch is a standard one and will not be described in detail. The voltage $Vo_{II}$ is integrated by integrator III. The gate $G_9$ is closed by pulse $PX_1$ setting flip flop $FF_9$ and voltage $Vo_{IV}$, which represents $f^1(x)$, is integrated by integrator V. The output of integrator V is $a+F(x)$. When PX occurs it resets flip flop $FF_9$, opening gate $G_9$. The output of operational amplifier IV, $Vo_{IV}$, is then zero and integrator V stops integrating. The output of integrator V, $Vo_V$ is clamped at the desired function value $a+F(x)$. Pulse $CP_3$ then sets flip flop $FF_2$ which initiates the downsweep. This is terminated by the comparator pulse which represents $(Pf(x))$. PX also triggers a delay multivibrator which resets all other integrators to zero for the next operation. The details of this reset operation and the various ways of injecting channel pulses to the flip flops to ensure that they are all in the correct state at the start of the operation have been omitted for simplicity. These are standard operations and are not involved in the actual function generation.

This method of function generation places certain restrictions on the maximum slope and curvature that a function may have. This is due to the sequential manner in which the pulses occur and due to the limits in achieving a fast precision linear sweep and high speed switching. However, nearly all empirical and theoretical functions occurring in physical systems meet these restrictions.

There are various ways of obtaining the sign information which operates gates $G_3$ and $G_4$. A simple method is to have a sign pulse follow the PY pulse after a very short time interval (for example 10μsec.). An open circuited or short circuited delay line can then be used to detect whether a pulse is followed after a 10μsec. delay by a second pulse. One circuit can be used to reject the 10μsec. delayed pulse from triggering any of the flip flops. A second circuit can be used to trigger a sign flip flop (which controls $G_3$ and $G_4$) under the same conditions. These operations can be achieved by standard circuits and will not be described any further.

A block diagram of any integrator unit according to the invention is shown in FIGURES 13*a* and 13*b*. In a pulse position modulation analog computer the integrator unit controls the rate at which the pulse position of the dependent variable changes. Being analog in its operation the integrator is affected by drift effects. To reduce drift to an insignificant level the integrating action is carried out by a double channel process. One channel is digital in nature and is called the coarse channel. It could, for example, have 100 distinct values. The integrating action is actually carried out in an analog fine channel. The digital coarse channel simply keeps count of the number of times the fine channel variable has reached its limits. By this method there is no drift in the digital coarse channel and the drift of the analog fine channel becomes an effect of higher order and is insignificant. The integrator unit must, in order to be interconnected with other arithmetic units, be built up from the same basic units.

To understand the integrator action consider the timing pulses shown in FIGURE 10. These may be generated by a clock track on the magnetic drum. The fundamental clock signal is a sine wave and is used to generate the sine clock pulses (SCP). The clock sine wave is shifted 90° to generate the cosine clock pulses (CCP). By divider action the SCP are divided down to give the channel pulses ($CP_1$, $CP_2$ . . . ) and the channel gate pulses. Division is accomplished by counting. For example the channel can be divided up into 100 clock pulses. By using standard techniques these 100 pulses are counted giving a channel pulse for each count of 100. For the integrator, additional pulses and gates are required and these are obtained from the divider chain. An early gate, zero gate and late gate is generated as shown. The CCP which these gates overlap are designated as the early pulse (EP), zero pulse (0P) and late pulse (LP) respectively. These pulse groups are required to control the downsweep in the coarse scale. For the fine scale two additional pulses (P+ and P−) are required (see FIGURE 11*b*). These pulses are all determined by counting and by gate selection circuits. The pulses $CP_1$, P−, P*a*, P+, $CP_2$ divide a channel into four equal parts. If, for example, a channel is represented by 100 clock pulses, a count of 25 repeated 4 times would generate these pulses. There are numerous possibilities of generating these pulses which are all standard methods. It is actually the time-position of these pulses which is of significance. The early, zero and late gates can, for example, be generated by three flip flops. Alternatively, high speed decade counter tubes can be used and all required pulses obtained from the cathode outputs.

The maximum absolute value that a variable can have in the fine scale is $a/2$. If the absolute value exceeds this, $a/2$ is added or substracted from the fine scale variable and the coarse scale count increases or decreases by 1.

In the drawings, FIG. 11*b*, Case I has been illustrated for $Vo=V+$ and Case III for $Vo=V-$. The precise level at which the $V+\leqq Vo\leqq V-$ comparator triggers is not important. For example, with Case I it may be that the comparator will operate if V*o* is slightly smaller than V+. However, it is easily seen that no error is involved since the coarse and fine scale together give the correct result. A similar discussion is valid for Case III.

The following logical decision operations are sufficient to accomplish this (V*o* is the output of the fine scale sweep circuit).

(I) If $Vo>V+$ (see FIGURE 11*b*) the downsweep in the fine channel is initiated by P+ and in the coarse channel by LP.

(II) If $V-<Vo<V+$ the downsweep in the fine channel is initiated by CP and in the coarse channel by 0P.

(III) If $Vo<V-$ the downsweep in the fine channel is initiated by P− and in the coarse channel by EP.

By means of these decision operations the addition or subtraction of $a/2$ in the fine scale is automatically carried out. In the coarse scale the early, zero or late gates control the CCP, which initiate the downsweep. When the comparator pulse occurs the downsweep is terminated. This pulse generates a comparator gate pulse which selects the next SCP. The distance between $CP_2$ and the selected SCP is the coarse value of the variable (see FIGURES 11 and 12 where the fine and coarse sweep for Cases I, II, III are illustrated). By this operation of pulse selection in the coarse scale drift is completely eliminated. The decision making element is a simple voltage comparator which operates according to $$V-\leqq Vo\leqq V+$$

This, in turn controls the gates.

It is seen that by the use of these additional gates and gate pulses the same basic sweep circuit can be used to carry out the operation of adding (or subtracting) small increments. Through the use of a double channel system it does this with very small drift and with a precision comparable to the other arithmetic operations. A method will now be described by which this basic integrator can be made to carry out repeated integrations.

Any integrated variable *y* is represented by Y, where $$Y=Y_e+Y_f$$

where $Y_e$ is its coarse value and $Y_f$ its fine value. Integration is based on the following approximation for incremental quantities:

$$\Delta Y+a=(\Delta Yo+a)+(Y_c^1\Delta t+a)-a$$

This neglects second order terms which become negligible when $\Delta t$ is sufficiently small. $\Delta Yo$ is the initial value of the increment which is in the fine channel. $Y_c^1\Delta t$ is added to give the new increment ΔY. The logical decision-operation described is applied to ΔY. As the increments accumulate they are carried over to the coarse channel. For details of the operation consider FIGURES 11*a* to 13. In these figures the block diagram symbols, pulse designations, etc. are similar to those used in the preceding discussion of other operational units.

In the coarse channel, pulses $CP_1$ and $Py_c^1$ set and reset flip flop $FF_1$ respectively (FIG. 12*a*).

The output of integrator I represents $Y_c^1+a$. This is modulated by having the EP, 0P or the LP initiate the downsweep. The selected SCP represents the new $Y_c^1$. In the fine channel the operation is similar to that of the adder circuit previously described. Pulses $CP_2$ and the new $Py_c^1$ set and reset flip flop $FF_5$ respectively, giving $Y_c^1 \Delta t + a$ (FIG. 11*a*). Pulses $CP_2$ and $P\Delta yo$ set and reset flip flop $FF_6$ respectively. The quantity $a$ is subtracted by having pulses $CP_2$ and $Pa$ set and reset flip flop $FF_{11}$ respectively.

The output of integrator IV (FIG. 13*b*) represents $\Delta Y + a$. In the coarse channel (FIG. 13*a*), pulses $CP_2$ and $Py_c$ set and reset flip flop $FF_2$ respectively. The output of integrator II represents $Y_c + a$. The logical decision is made by the voltage comparator $C_2$ and integrators II and IV are accordingly demodulated. The new pulses are rewritten on the drum. Thus it is seen that to permit a continuous input-output of all channels, both the coarse and the fine scales have duplicate odd and even channels (FIGS. 13*a* and 13*b*). By means of the interconnections shown in these figures, it is possible to carry out multiple integrations.

It is thus seen that incremental computations are carried out by a double channel process. There is a fine scale which carries out incremental additions in a manner similar to that described for the adder. This operation differs from the adder and is novel in the manner that carries and borrows are made to the coarse scale. If the fine scale increment $\Delta Y$ exceeds $$+\frac{a}{2}$$

(its maximum value) a "one" is carried to the coarse scale and $a/2$ subtracted from the fine scale. If $\Delta Y$ is less than $$-\frac{a}{2}$$

a "one" is borrowed from the coarse scale and $a/2$ added to the fine scale. The novelty in this method depends on the fact that the incremental computation is carried out using an analog method while the accumulated sum is quantized into a digital form. The circuit details are shown in FIGURE 11*a*, FIGURE 12*a*, and FIGURE 13. This technique would only be of practical value if it could carry out a large number of incremental computations with the same circuitry. This means the circuitry should have time sharing capabilities. That this is readily accomplished is shown in FIGURE 13. Using a magnetic drum for storage, it is relatively simple to time share the circuitry. By interconnecting the outputs to inputs of other similar units, multiple intergrations can be carried out in a manner similar to that of conventional analog computers or digital differential analyzers.

The integrator, as described, carries out repeated integrations automatically. The integration process can be stopped by using gates to block the inter-section between the fine and coarse channels. This operation is required in order to enter the highest order derivatives into the fine scale to start the chain of repeated integrations.

The quantity $\Delta t$ is related to the speed of the drum, since an increment is added for each drum revolution. This requires a precision speed control of the drum drive motor. In this case $\Delta t$ is fixed and enters into the integration operation as a scaling factor. Another alternative is to drive the drum at a nearly constant speed and to vary the slopes of the sweeps in the fine channels by a precision comparison circuit. Both methods accomplish the same purpose in that the rate at which increments accumulate is the same.

It is seen that time is the independent variable. This makes a pulse position modulation analog computer somewhat inflexible as a general purpose computer. However, in real-time systems simulation, time is the only independent variable so that there is no loss of flexibility for this application.

Most of the circuits used in performing the operations described above are standard and require no further description. The modulation-demodulation process requires a positive aind negative sweep of equal slopes. Since all operations are carried out by these sweeps it is extremely important to have a simple, accurate, and fast gate. This can be achieved by a modified diode gate in conjunction with a feedback amplifier. Consider the arrangement of FIGURE 14. All diodes are of the silicon junction type which has an extremely high back resistance. By means of a precision bridge comparison method the RC time constants for all the sweep circuits are adjusted to be the same. If the control voltages, $V_{C1}$ and $V_{C2}$, are such that diodes $D_1$ and $D_2$ are non-conducting then diodes $D_3$ and $D_4$ conduct and the voltage $V_g$ is zero. If $V_{C1}$ becomes positive by a few volts, then diode $D_3$ becomes non-conducting. The feedback amplifier keeps $V_g$ close to zero and the current $i_1$ is diverted into the condenser C to give a negative linear sweep voltage as the output. On the other hand if $V_{C2}$ becomes negative by a few volts a positive sweep is generated. If both diodes $D_1$ and $D_2$ conduct, then diodes $D_3$ and $D_4$ are non-conducting and no current enters C. For very fast switching a fast recovery germanium diode can be used in series with the silicon diode to overcome the relatively slow recovery of the silicon diode.

This gate has several important features. It allows all the arithmetic operations to be carried out in a simple manner. The use of the operational amplifier to keep $V_g$ close to zero means that only small control voltages ($V_{C1}$ and $V_{C2}$) are required. The current flowing in the resistors remains nearly constant and the switching action simply diverts the current flow. Because of this, inductive and capactive effects tending to slow up the operation are minimized.

The computer is programmed by using the channel gates to control the channel pulses which set the flip flops. The reset action in the arithmetic units is automatically carried out by the following pulse. This leads to a simple method of controlling the operation of the computer. In the case of the function generator the channel gate is used to select a channel pulse which starts the entire operation.

Similar operations are assigned different channels on the same track of the magnetic drum. Different operations are assigned to different tracks. The ability of a pulse position modulation analog computer to work in real time is due to this combined serial-parallel operation. The entire program is completed during one revolution of the drum.

What I claim as my invention is:

1. A pulse position modulation computer circuit comprising a Miller integrator, a first flip flop circuit adapted to be set by a first pulse thereby to gate a first constant direct voltage to the input of the integrator and adapted to be reset by a second pulse thereby to remove the said first constant voltage from the input of the integrator, a second flip flop circuit adapted to be set by a third pulse thereby to gate a second constant direct voltage whose magnitude is equal and opposite to that of the first constant voltage to the integrator and adapted to be reset by a fourth pulse thereby to remove the said second constant voltage from the input of the integrator, a voltage comparator adapted to compare the output voltage of the integrator with a fixed comparison voltage and adapted to generate said fourth pulse when the output voltage of the integrator equals the comparison voltage, the voltage applied to the input of the integrator being zero in the absence of all of said constant voltages.

2. A pulse position modulation computer circuit comprising a constant linear sweep generating means, a first sweep triggering means adapted in response to a first pulse to cause said sweep generating means to produce a first voltage whose initial value is zero and whose voltage/time slope is a non-zero finite constant and adapted in response to a second pulse to clamp the output voltage of the sweep generating means at a constant value, a second sweep triggering means adapted in response to a third pulse to cause said sweep generating means to produce a second voltage whose initial value is the said clamped output voltage and whose voltage/time slope is equal and opposite to that of the said first voltage, said second sweep triggering means being adapted in response to a fourth pulse to clamp the output voltage of the sweep generating means at a constant value, and a voltage comparison means adapted to compare the output voltage of the sweep generating means with a fixed comparison voltage, and adapted to generate said fourth pulse when the said output voltage is equal to the comparison voltage.

3. An adder circuit comprising a Miller integrator, a first flip-flop circuit adapted to gate a first constant direct voltage to the input of the integrator for the time interval between a first and a second pulse, a second flip flop circuit adapted to gate a second voltage equal and opposite to said first constant direct voltage to the input of the integrator for the time ineral between a third and a fourth pulse, a first comparator adapted to gate said third pulse to the second flip-flop whenever the output voltage of the integrator exceeds a first comparison voltage, a second comparator adapted to generate an output pulse when the output voltage of the integrator becomes equal to a second comparison voltage.

4. Apparatus comprising a Miller integrator, a first flip-flop circuit adapted to gate a first constant direct voltage to the input of the integrator for a time interval between a first pulse and a second pulse, a second flip flop circuit adapted to gate a second constant direct voltage equal and opposite to the first constant voltage to the input of the integrator for a time interval between a third pulse and a fourth pulse, the integrator being adapted to generate an output voltage whose initial value is zero, which output voltage represents the time integral of the voltage applied to the integrator input, the integrator input voltage being zero except when one of said constant voltages is applied to the integrator input, and a comparator sensitive to the integrator output voltage and adapted to generate an output pulse when the integrator output voltage becomes equal to a comparison voltage.

5. Apparatus as claimed in claim 4, wherein the said comparison voltage is zero.

References Cited in the file of this patent

UNITED STATES PATENTS

| | | |
|---|---|---|
| 2,431,024 | Bryce | Nov. 18, 1947 |
| 2,671,608 | Hirsch | Mar. 9, 1954 |
| 2,710,348 | Baum et al. | June 7, 1955 |
| 2,773,641 | Baum | Dec. 11, 1956 |
| 2,854,577 | Torode | Sept. 30, 1958 |
| 2,891,721 | Chenus | June 23, 1959 |
| 2,931,566 | Strassner | Apr. 5, 1960 |
| 3,002,690 | Meyer | Oct. 3, 1961 |